(12) United States Patent
Okinaga et al.

(10) Patent No.: US 8,139,317 B2
(45) Date of Patent: Mar. 20, 2012

(54) DISK DRIVE DEVICE WHICH INCLUDES A CLAMPING MAGNET FOR ATTRACTING A DISK

(75) Inventors: Kinjirou Okinaga, Tottori (JP); Masahito Hidaka, Tottori (JP); Koji Kuyama, Tottori (JP)

(73) Assignee: Minebea Motor Manufacturing Corporation, Tokyo (JP)

( * ) Notice: Subject to any disclaimer, the term of this patent is extended or adjusted under 35 U.S.C. 154(b) by 1016 days.

(21) Appl. No.: 12/089,542

(22) PCT Filed: Oct. 9, 2007

(86) PCT No.: PCT/JP2007/069651
§ 371 (c)(1),
(2), (4) Date: Apr. 8, 2008

(87) PCT Pub. No.: WO2008/050602
PCT Pub. Date: May 2, 2008

(65) Prior Publication Data
US 2009/0161252 A1    Jun. 25, 2009

(30) Foreign Application Priority Data
Oct. 24, 2006 (JP) .................. 2006-288160

(51) Int. Cl.
*G11B 17/028* (2006.01)
(52) U.S. Cl. .................. 360/99.04; 360/99.12; 720/710
(58) Field of Classification Search ............ 360/99.04, 360/99.12; 720/710
See application file for complete search history.

(56) References Cited

U.S. PATENT DOCUMENTS

| 5,050,158 | A  | * | 9/1991 | Kitada et al. .................. 720/710 |
| 5,796,193 | A  | * | 8/1998 | Sakano et al. ............... 310/67 R |
| 6,016,238 | A  | * | 1/2000 | Yoshikawa et al. ........ 360/99.08 |
| 6,252,319 | B1 | * | 6/2001 | Sudo et al. .................. 310/67 R |
| 7,538,459 | B2 | * | 5/2009 | Ichizaki ....................... 310/67 R |
| 2004/0061404 | A1 | * | 4/2004 | Fujii et al. ..................... 310/216 |

FOREIGN PATENT DOCUMENTS

| JP | 5-290483   | 11/1993 |
| JP | 6-43850    | 6/1994  |
| JP | 8-102115   | 4/1996  |
| JP | 3028842    | 6/1996  |
| JP | 8-221860   | 8/1996  |
| JP | 9-44951    | 2/1997  |
| JP | 09-297959  | 11/1997 |
| JP | 10-3740    | 1/1998  |
| JP | 2000-251360| 9/2000  |
| JP | 2001-84684 | 3/2001  |
| JP | 2006-065907| 3/2006  |

* cited by examiner

Primary Examiner — Jefferson Evans
(74) Attorney, Agent, or Firm — Steptoe & Johnson LLP

(57) ABSTRACT

The present invention provides a disk drive device that can appropriately clamp a disk by means of magnetic force even when the disk drive device is very small. A clamping magnet 16 on which a disk 20 is mounted is attached to a turntable portion 15b of a rotor frame 15 to attract the disk 20. The clamping magnet 16 is configured so that the disk 20 can be mounted on the clamping magnet 16. An area of the rotor frame 15 from the turntable portion 15b to a boss portion 15a is composed of a ferromagnetic material.

6 Claims, 3 Drawing Sheets

DISK DRIVE DEVICE WHICH INCLUDES A CLAMPING MAGNET FOR ATTRACTING A DISK

TECHNICAL FIELD

The present invention relates to a disk drive device in which a disk is removably installed, and in particular, to a disk clamp structure.

BACKGROUND ART

Disk drive devices are already known which utilize a magnetic force to clamp a removable disk when the disk is mounted on a turntable rotated by a motor.

As shown in FIG. 3, in these disk drive devices, a clamping magnet 112 is fittingly assembled around an outer peripheral portion of a boss portion 111 of a turntable 110 fixed to a rotating shaft 118 of a motor 117. A disk mounting portion 113 on which a disk 115 is mounted is placed in an outer peripheral portion of the turntable 110. To be placed in the disk drive device, the disk 115 is mounted on the disk mounting portion 113. A magnetic material 116 such as a metal plate disposed in a cassette or the like (or a clamp device provided together with the disk drive device) for the disk 115 is then attracted by the magnetic force of the clamping magnet 112 to sandwich the disk 115 between the disk mounting portion 113 of the turntable 110 and the magnetic material 116. The disk 115 is thus clamped so as not to slip or liberate with respect to the turntable 110 when rotated. The disk is held in a stable posture. In the conventional disk drive device, an area in which the clamping magnet 112 is disposed is different from an area in which the disk mounting portion 113 is provided; the areas are individually provided.

There has been a demand for miniaturization of these disks and disk drive devices. Instead of having the turntable provided separately from the motor, a configuration in practical use which enables a reduction in the thicknesses of the disk and the disk drive device has a disk mounting portion formed on a rotor frame constituting an outer portion of a rotor of the motor so that the rotor frame itself can also be used as the turntable. This allows the motor and the turntable to be formed using only one part, enabling a reduction in the number of parts required and in the thickness of the device.

An optical disk drive device disclosed in JP10-3740A has been proposed as a configuration that not only allows the motor and the turntable to be formed using only one part but also achieves simplification. As shown in FIG. 4, JP10-3740A proposes that in the optical disk drive device, a whole rotor frame 120 on which a boss portion 121 and a turntable portion (disk mounting portion) 122 are provided be integrally formed of a magnetic material such as a plastic magnet. The optical disk drive device is configured so that the disk 115 is placed on the turntable portion 122 formed on the rotor frame 120, having a magnetic function as the clamping magnet.

DISCLOSURE OF THE INVENTION

However, an attempt to further reduce the size of the disk and the disk drive device (for example, an attempt is made to reduce the diameter of the disk to at most 1 inch and to correspondingly reduce the size of the disk drive device to, for example, about 10 mm) reduces the size of the rotor frame itself and significantly reduces the size of the boss portion of the rotor frame. If a structure is adopted in which the clamping magnet is fitted around the boss portion, the size of the clamping magnetic is significantly reduced and the magnetic force of the clamping magnet markedly weakens. This prevents the disk from being stably held (clamped).

Furthermore, in the optical disk drive device disclosed in JP10-3740A, described above, the whole rotor frame 120 is integrally formed of the magnetic material, whereas no yoke covering the rotor frame 120 is provided. Thus, disadvantageously, a magnetic flux from the rotor frame 120 may diffuse to the exterior. This prevents the formation of an appropriate magnetic path (closed magnetic circuit) extending from the turntable portion 122 through the disk 115 to a magnetic material 116. If the disk 115 or the rotor frame 120 is too small, the clamp force required to reliably hold the disk 115 may not be exerted.

The present invention solves these problems. An object of the present invention is to provide a disk drive device that can appropriately clamp a disk by a magnetic force even when the disk drive device is very small.

To attain the object, the present invention provides a disk drive device comprising a rotor frame to which a rotating shaft is fixed, the rotor frame having a boss portion to which the rotating shaft is fixed and which is inserted through a disk hole, a turntable portion extending outward in a radial direction from the boss portion, and a cylindrical portion extending cylindrically from an outer periphery of the turntable portion, the disk drive device further comprising a clamping magnet attached to the turntable portion to attract a disk and on which the disk can be mounted, the clamping magnet being configured so that the disk can be mounted on the clamping magnet, an area of the rotor frame from the turntable portion to the boss portion comprising a ferromagnetic material. The whole rotor frame may be composed of the ferromagnetic material.

In this configuration, the disk can be mounted on the clamping magnet, which is thus also used as a disk mounting portion. Consequently, even if the disk and the disk drive device are very small, the clamping magnet having a relatively large area can be attached to the turntable portion of the rotor frame. Furthermore, the turntable portion of the rotor frame to which the clamping magnetic is attached is composed of the ferromagnetic material. The turntable portion thus functions as a back yoke and can prevent a magnetic flux from the clamping magnet from leaking to the exterior through the turntable portion when mounting the disk. Moreover, since the area of the rotor frame from the turntable portion, to which the clamping magnet is attached, to the boss portion is composed of the ferromagnetic material, the area of the rotor frame from the turntable portion to the boss portion is configured as a part of a magnetic path (closed magnetic circuit) to a magnetic material provided in the disk side from the clamping magnet. As a result, a large amount of magnetic flux flows to provide the clamp force required to reliably hold the disk even if the disk and the disk drive device are very small.

Furthermore, according to the present invention, a groove portion is formed between the boss portion of the rotor frame and the clamping magnet along a circumferential direction, so as to form a gap between the boss portion of the rotor frame and the clamping magnet.

The groove portion forms the gap between the boss portion of the rotor frame and the clamping magnet. Consequently, the gap makes it possible to inhibit the situation in which the clamping magnet comes into direct contact with the boss portion of the rotor frame to make the connection of the magnetic flux from the clamping magnet via a short path extending only within the boss portion of the rotor frame, reducing the magnetic flux reaching the magnetic material provided in the disk side.

Furthermore, according to the present invention, a nonslip material having a larger coefficient of friction than the clamping magnet is attached to the disk mounting portion of the clamping magnet on which the disk is mounted, and the disk is mounted on the turntable portion of the rotor frame via the clamping magnet and the nonslip material.

Thus, the disk contacts the rotor frame under a strong frictional force via the nonslip material having the large coefficient of friction. This further reliably prevents the disk from slipping with respect to the turntable portion during rotation. Furthermore, the nonslip material is attached to the disk mounting portion of the clamping magnet, that is, in a plan view in which the disk drive device is viewed perpendicularly to a disk surface, the clamping magnet overlaps the nonslip material. Thus, even if the disk and the disk drive device are very small, the clamping magnet and the nonslip material may have relatively large areas. Moreover, the disk is mounted on the clamping magnet via the nonslip material. Consequently, when the nonslip material precisely manufactured is used, the distance between the clamping magnet and the disk can be accurately managed. Moreover, even if the nonslip material used is very thin, the clamping magnet can be prevented from directly abutting against the disk.

Furthermore, according to the present invention, the rotor frame is formed so that the boss portion and the turntable portion are separate from each other.

Compared to the case in which the whole rotor frame is integrally formed or the part of the rotor frame which includes the boss portion and the turntable portion is integrally formed, this configuration allows the boss portion of the rotor frame and the turntable portion of the rotor frame to be each formed of a small block material. This enables a reduction in manufacturing costs. Furthermore, since the boss portion and the turntable portion are formed by processing the small block materials, even if the processing involves, for example, machining, areas processed by machining can be reduced. This in turn enables a reduction in the time required for processing and also in manufacturing costs.

Furthermore, according to the present invention, the turntable portion of the rotor frame is thicker than the cylindrical portion.

With this configuration, even when the clamping magnet has a higher energy product than rotor magnets, the magnetic flux can be effectively inhibited from leaking to the exterior. Furthermore, when the clamping magnet used has a high energy product, the disk can be reliably held even with an increase in the size of the gap between the clamping magnet and a magnetic material on a back surface of the disk.

As described above, according to the present invention, the clamping magnet, which attracts the disk, is attached to the turntable portion of the rotor frame. Thus, even if the disk drive device is very small, the clamping magnet having a relatively large area can be attached to the turntable portion of the rotor frame. Since the area of the rotor frame from the turntable portion, to which the clamping magnet is attached, to the boss portion is composed of the ferromagnetic material, the magnetic flux from the clamping magnet can be prevented from leaking to the exterior through the turntable portion. Furthermore, the area of the rotor frame from the turntable portion to the boss portion is configured as a part of the magnetic path (closed magnetic circuit) to the magnetic material provided in the disk side from the clamping magnet, and a large amount of magnetic flux flows through this area. Consequently, even if the disk and the disk drive device are very small, the clamp force required to reliably hold the disk can be exerted. This makes it possible to improve the reliability of the disk drive device.

Furthermore, the groove portion is formed between the boss portion of the rotor frame and the clamping magnet along the circumferential direction. The groove portion forms the gap between the boss portion of the rotor frame and the clamping magnet. This prevents the magnetic flux from the clamping magnet from being short-circuited in the boss portion of the rotor frame to reduce the magnetic flux reaching the magnetic material provided in the disk side.

Additionally, the nonslip material having the larger coefficient of friction than the clamping magnet is attached to the disk mounting portion of the clamping magnet. The disk is mounted on the turntable portion of the rotor frame via the clamping magnet and the nonslip material. Thus, even if the disk and the disk drive device are very small, both the clamping magnet and the nonslip material may have relatively large areas. This makes it possible to appropriately prevent the disk from slipping. Furthermore, when the nonslip material precisely manufactured is used, the distance between the clamping magnet and the disk can be accurately managed, improving the reliability. Moreover, even if the nonslip material used is very thin, the clamping magnet can be prevented from abutting directly against the disk. This also improves the reliability.

Furthermore, the rotor frame is configured so that the boss portion and the turntable portion are separate from each other. This enables a reduction in manufacturing costs.

Additionally, the turntable portion of the rotor frame is formed to be thicker than the cylindrical portion. Even when the clamping magnet used has a higher energy product than rotor magnets, the magnetic flux can be effectively inhibited from leaking to the exterior. Furthermore, when the clamping magnet used has a high energy product, the disk can be reliably held even with an increase in the size of the gap between the clamping magnet and the magnetic material on the back surface of the disk. This improves the reliability.

BEST MODE FOR CARRYING OUT THE INVENTION

Figure 1:
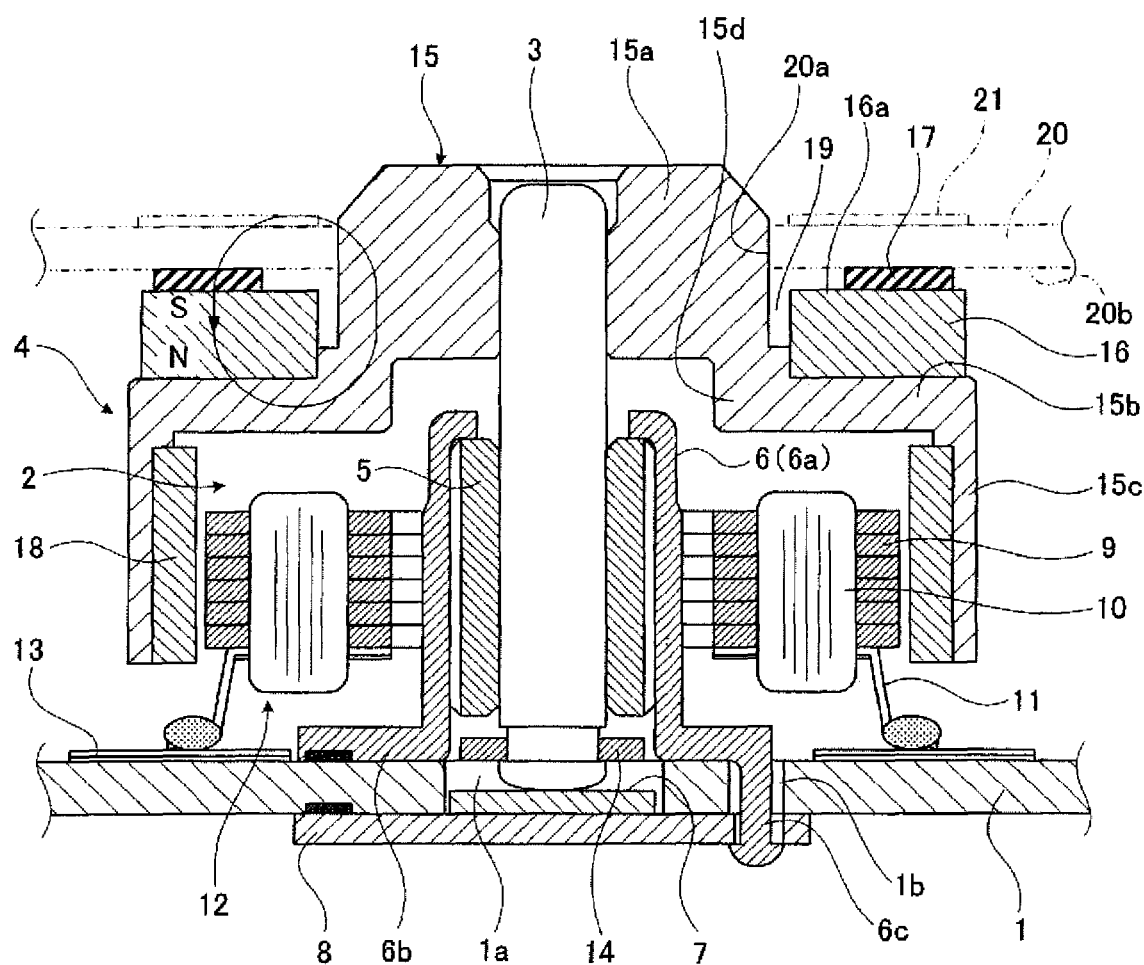
FIG. 1 is a vertically sectional front view of a disk drive device according to an embodiment of the present invention.

Disk drive devices according to embodiments of the present invention will be described below with reference to the drawings. FIG. 1 is a vertically sectional front view of a disk drive device according to an embodiment of the present invention.

As shown in FIG. 1, a disk drive device that rotates a disk 20 is composed of a brushless motor installed on a board 1 and having an external size of about 10 mm. The disk drive device is made up of a stator 2 as a non-rotating portion which is fixed to the board 1 and a rotor 4 as a rotating portion which rotates integrally with a rotating shaft 3.

The stator 2 is composed of a substantially cylindrical bearing 5 that rotatably holds the rotating shaft 3, a bearing housing 6 that presses the bearing 5 toward the interior thereof to allow the bearing 5 to stand upright on the board 1, a thrust plate 7 shaped like a disk and disposed in a hole 1*a* formed in the board 1, the thrust plate 7 abutting against a base end of the rotating shaft 3 in a thrust direction to rotatably support the rotating shaft 3, a thrust cover 8 attached to a bottom surface of the board 1 in the vicinity of the hole 1a to support the thrust plate 7 from below, and a coil assembly 12 made up of a core 9, a coil 10, and a terminal 11 externally fitted around a cylindrical upright portion 6a of the bearing housing 6. The terminal 11 is soldered and connected to a flexible board 13 stuck on the board 1. Reference numeral 14 in FIG. 1 denotes a retaining member that prevents the rotating shaft 3 from slipping out of the bearing 5 of the stator 2.

In the present embodiment, the bearing housing 6 has the cylindrical upright portion 6a to which the coil assembly 12 is externally fittingly attached, a base portion 6b placed on the board 1 so as to extend outward from a bottom end of the cylindrical upright portion 6a in a radial direction like a flat plate, and a projecting leg portion 6c projecting downward from a part of the base portion 6b through an insertion hole 1b in the board 1, the projecting leg portion 6c being welded to the thrust cover 8. The cylindrical upright portion 6a, the base portion 6b, and the projecting leg portion 6c are integrally formed of a metal plate or the like. The bearing housing 6 is secured to the board 1 via the base portion 6b by means of solder or the like. In the present embodiment, the bearing 5, made up of sintered metal, is impregnated with oil to rotatably support the rotating shaft 3. However, the present invention is not limited to this.

The rotor 4 has a rotor frame 15 constituting an outer shell of the rotor 4. The rotor frame 15 is composed of a boss portion 15a attached to a tip portion of the rotating shaft 3, a turntable portion 15b formed like a circular plate extending from the bottom of the boss portion 15a toward an outer periphery of the rotor frame in the radial direction, a cylindrical portion 15c extending cylindrically downward from an outer periphery of the turntable portion 15b, and a stepped portion 15d described below. The rotor 4 is composed of the rotor frame 15, an annular clamping magnet 16 attached to a top surface of the turntable portion 15b of the rotor frame 15 and having a rectangular cross section, a nonslip material 17 which is stuck to a disk mounting portion 16a corresponding to a top surface portion of the clamping magnet 16 and on which the disk 20 is placed, the nonslip material 17 being made up of a rubber plate or the like which has a larger coefficient of friction than the clamping magnet 16, and a driving magnet 18 attached to an inner periphery of the cylindrical portion 15c extending from the turntable portion 15b of the rotor frame 15 so as to cover the coil assembly 12 from the outer peripheral side, the driving magnet 18 being located facing the core 9. In the clamping magnet 16 used in the present embodiment, an N pole and an S pole are arranged opposite each other in a thickness direction of the clamping magnet 16 (FIG. 1 shows that the N pole is located in the lower part of the clamping magnet 16, while the S pole is located in the upper part of the clamping magnet 16).

In particular, in the present embodiment, the whole rotor frame 15 is formed of a ferromagnetic material.

The turntable portion 15b and the cylindrical portion 15c are configured so that the turntable portion 15b is thicker than the cylindrical portion 15c. A sintered magnet of rare earth is used as the clamping magnet 16. Furthermore, the stepped portion 15d is formed between the boss portion 15a and turntable portion 15b of the rotor frame 15. The clamping magnet 16 is fixed so as to abut against an outer peripheral surface of the stepped portion 15d. An annular groove portion 19 is formed between the clamping magnet 16 and the boss portion 15a along a circumferential direction.

The disk 20 is installed so that a disk hole 20a thereof is externally inserted around the boss portion 15a of the rotor frame 15. The boss portion 15a projects upward from the disk hole 20a. Furthermore, a magnetic material 21 such as a metal plate is disposed on a surface opposite to a mounting surface 20b of the disk 20 and attracted by the clamping magnet 16. The magnetic material 21 may be disposed on a clamp device provided together with the disk drive device instead of being provided on the disk 20 (or a disk cartridge or the like in which the disk 20 is provided).

Here, an assembly process for the stator 2 is performed by attaching the bearing housing 6 to the board 1 by means of welding, then sticking the flexible board 13 to the board 1, externally fitting the preassembled coil assembly 12 around the bearing housing 6, soldering the terminal 11 of the coil assembly 12 to the flexible board 13, and further pressing the bearing 5 into the bearing housing 6.

An assembly process for the rotor 4 is performed by pressing the rotating shaft 3 into the boss portion 15a of the rotor frame 15, then bonding the driving magnet 18 to the inner periphery of the cylindrical portion 15c of the rotor frame 15, also bonding the clamping magnet 16 to the top surface of the turntable portion 15b of the rotor frame 15, and further sticking the nonslip material 17 to the clamping magnet 16.

Then, the rotating shaft 3 of the rotor frame 15 is inserted into the bearing 5 of the stator 2. The retaining member 14 is installed at a lower end of the rotating shaft 3. Subsequently, the thrust plate 7 and the thrust cover 8 are assembled together, and the thrust cover 8 is soldered to the board 1. A tip portion of the projecting leg portion 6c of the bearing housing 6 is welded to the thrust cover B. The board 1 is then cut as required to complete the disk drive device. Then, in the disk drive device, the coil 10 is energized to rotate the rotor 4 and the rotating shaft 3.

In the above-described configuration, the disk 20 is installed so as to be fitted around the boss portion 15a of the rotor frame 15 and placed on the nonslip material 17. Then, since the rotor frame 15 is composed of the ferromagnetic material, almost all of a magnetic flux generated by the clamping magnet 16 flows from the turntable portion 15b of the rotor frame 15 via the stepped portion 15d to the boss portion 15a. The magnetic flux further flows into the magnetic material 21, disposed on an opposite surface to the mounting surface of the disk 20, and then returns to the clamping magnet 16 through the disk 20 and the nonslip material 17. A magnetic path (closed magnetic circuit) is thus formed. Thus, since the area of the rotor frame 15 from the turntable portion 15b to the boss portion 15a is composed of the ferromagnetic material, a large amount of magnetic flux flows between the clamping magnet 16 and the magnetic material 21. Consequently, even if the disk 20 and the disk drive device are very small, the clamp force required to reliably hold the disk 20 can be exerted.

Furthermore, in the above-described configuration, the disk 20 can be mounted on the clamping magnet 16, which is also used as the disk mounting portion. Thus, even if the rotor frame 15 of the disk drive device is very small, the clamping magnet 16 having a large area can be attached to the turntable portion 15b of the rotor frame 15 so as to cover the entire top surface thereof. Furthermore, since the turntable portion 15b of the rotor frame 15, to which the clamping magnet 16 is attached, is composed of the ferromagnetic material, the turntable portion 15b functions as a back yoke for the clamping magnet 16. This makes it possible to prevent the magnetic flux from the clamping magnet 16 from leaking to the exterior through the turntable portion 15b when the disk 20 is mounted on the disk drive device. Since the cylindrical portion 15c of the rotor frame 15 is also composed of the ferromagnetic material, the cylindrical portion 15c functions as a back yoke for the driving magnet 18. This makes it possible to prevent a magnetic flux from the driving magnet 18 from leaking to the exterior through the cylindrical portion 15c.

Furthermore, the groove portion 19 is formed between the boss portion 15a of the rotor frame 15 and the clamping magnet 16 along the circumferential direction so as to form a gap between the boss portion 15a of the rotor frame 15 and the clamping magnet 16. Consequently, the gap of the groove portion 19 makes it possible to inhibit a possible reduction in the amount of magnetic flux reaching the magnetic material 21, provided on the disk 20. That is, if the groove portion 19 is not formed between the boss portion 15a of the rotor frame 15 and the clamping magnet 16, and the clamping magnet 16 is in direct contact with the boss portion 15a of the rotor frame 15, the magnetic flux from the clamping magnet 16 is connected to the magnetic material via a short path extending only within the boss portion 15a of the rotor frame 15. This reduces the amount of magnetic flux reaching the magnetic material 21 provided on the disk 20 side. However, the above-described configuration can prevent such a possible defect.

Thus, with the above-described configuration, even if the disk drive device is very small, the clamp force required to reliably hold the disk 20 can be exerted. This makes it possible to improve the reliability of the disk drive device.

Furthermore, the disk 20 is mounted on the nonslip material 17 having a large coefficient of friction. Consequently, the nonslip material 17 contacts the disk 20 under a strong frictional force. This makes it possible to reliably prevent the disk 20 from slipping with respect to the turntable portion 15b while the disk 20 is being rotated.

Furthermore, in this configuration, the nonslip material 17 is attached to the disk mounting portion 16a of the clamping magnet 16, that is, in a plan view in which the disk drive device is viewed perpendicularly to the disk surface, the clamping magnet 16 overlaps the nonslip material 17. Thus, even if the rotor frame 15 of the disk drive device is very small, the clamping magnet 16 and the nonslip material 17 may have large areas. This configuration also makes it possible to prevent the possible disk surface runout of the disk 20 and possible disk reading errors. Also in this case, the reliability of the disk drive device can be improved.

Furthermore, the disk 20 is mounted on the clamping magnet 16 via the nonslip material 17. Thus, when the nonslip material 17 precisely manufactured is used, the distance between the clamping magnet 16 and the disk 20 can be accurately managed. Moreover, even if the nonslip material 17 used is very thin, the clamping magnet 16 can be prevented from abutting directly against the disk 20. That is, when the clamping magnet 16 and the nonslip material 17 are provided in separate areas and if the nonslip material 17 is very thin, the clamping magnet 16 may abut against the disk 20 contrary to settings not requiring the abutment of clamping magnet 16 against the disk 20, owing to an error in the manufacture of the turntable portion 15b of the rotor frame 15, an error in the manufacture of the clamping magnet 16 or the nonslip material 17, or an error in the assembly of these components. However, the above-described configuration can prevent such a possible defect.

The nonslip material 17 may be processed by cutting or polishing to obtain the accuracy required for reading from the disk 20 after the nonslip material 17 has been attached to the clamping magnet 16.

Figure 2:
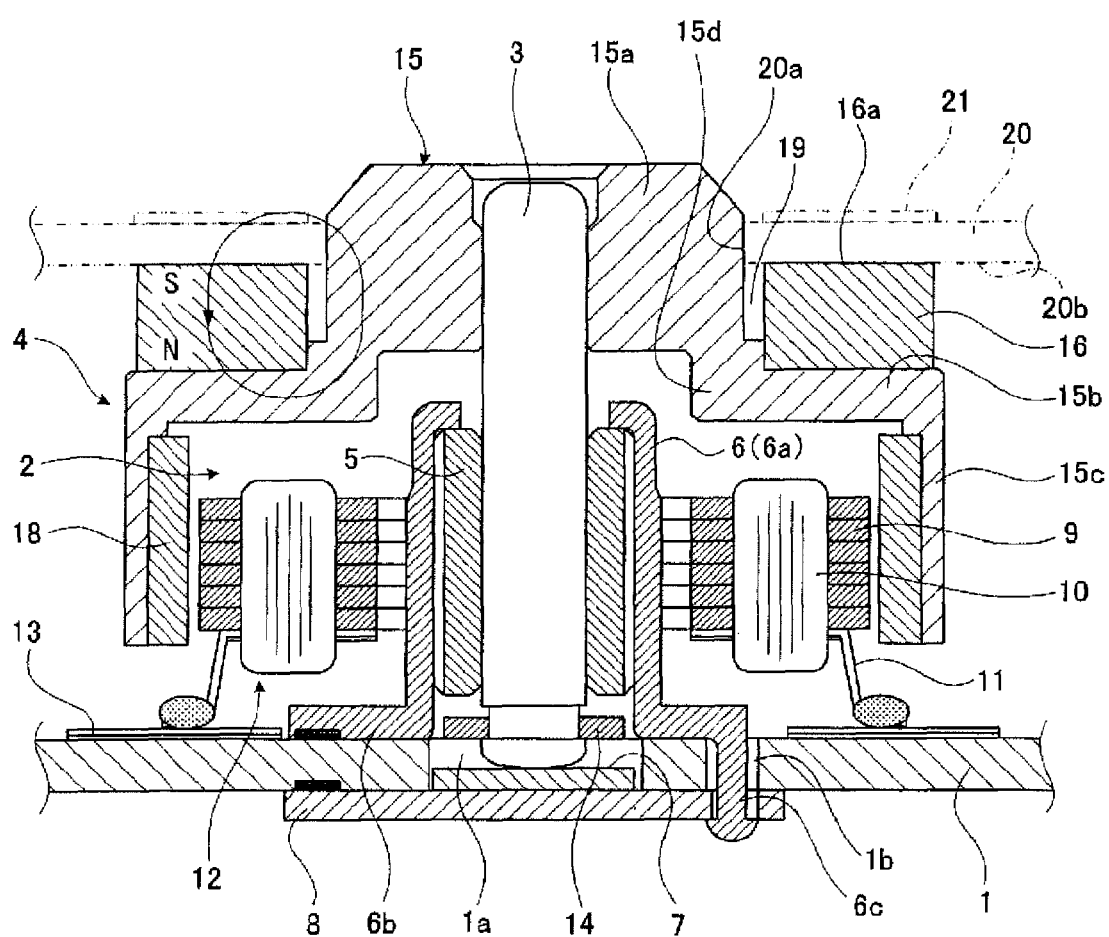
FIG. 2 is a vertically sectional front view of a disk drive device according to another embodiment of the present invention.
Figure 3:
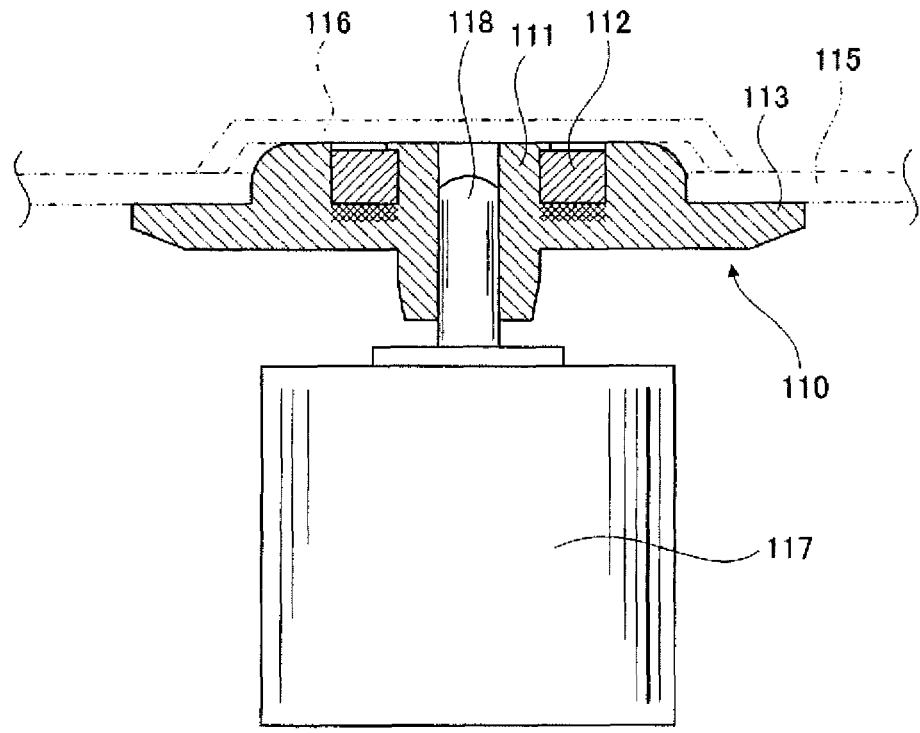
FIG. 3 is a partially vertical sectional front view of a conventional disk drive device.
Figure 4:
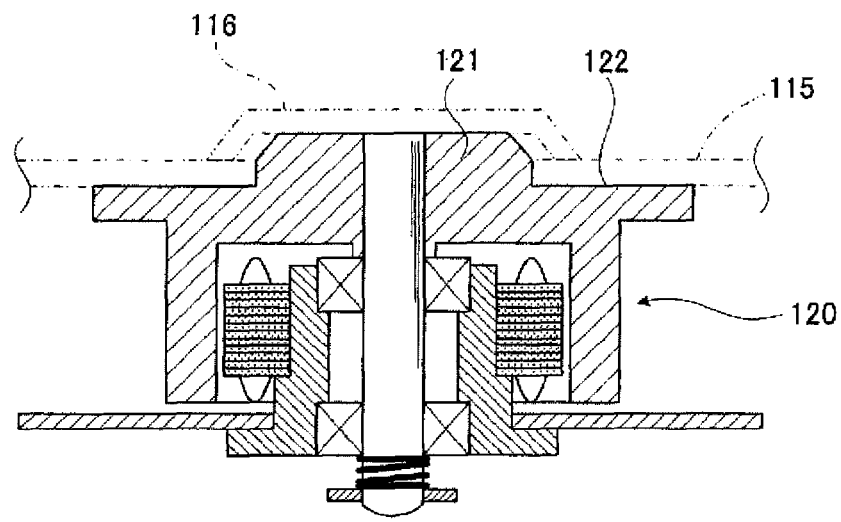
FIG. 4 is a vertically sectional front view of another conventional disk drive device.

Furthermore, the separate step of attaching the nonslip material 17 to the clamping magnet 16 may be omitted by attaching a material for the nonslip material to the disk mounting portion 16a of the clamping magnet 16 through surface treatment or the like. Alternatively, as shown in FIG. 2, the nonslip material 17 may be omitted by using, for the clamping magnet 16, a material having a large coefficient of friction sufficient to tightly contact the disk 20 and processing the clamping magnet 16 so as to obtain the required accuracy.

Furthermore, in the above-described configuration, the turntable portion 15b of the rotor frame 15 is thicker than the cylindrical portion 15c. Thus, even if the clamping magnet 16 used has a higher energy product than the driving magnet 18 for the rotor 4, the magnetic flux can be effectively inhibited from leaking to the exterior. Additionally, when the clamping magnet 16 used has a high energy product, the disk 20 can be reliably held even with an increase in the size of the gap between the clamping magnet 16 and the magnetic material 21 on the back side of the disk 20. This improves the reliability.

Furthermore, in the above description of the embodiment, the whole rotor frame 15 is formed of the ferromagnetic material. However, the present invention is not limited to this. The rotor frame 15 may be processed such that only the following areas are formed of the ferromagnetic material: the area corresponding to the magnetic path from the clamping magnet 16 for the rotor frame 15, that is, the part from the area of the turntable portion 15b which corresponds to the clamping magnet 16 to the area of the boss portion 15a which is close to the magnetic material 21, as well as the area of the cylindrical portion 15c of the rotor frame 15 which corresponds to the driving magnet 18.

Furthermore, in the above-described embodiment, the clamping magnet 16 has the N pole and the S pole arranged opposite each other in the thickness direction thereof. However, the present invention is not limited to this. A large number of N poles and S poles may be alternately provided in the circumferential direction of the clamping magnet 16. This configuration can be used without any problem.

INDUSTRIAL APPLICABILITY

The disk drive device according to the present invention is particularly suitable for a small-sized type but is not limited to this. The disk drive device according to the present invention is applicable to various disk drive devices.

The invention claimed is:

1. A disk drive device comprising a rotor frame to which a shaft is rotatably fixed, the rotor frame having a boss portion to which the shaft is rotatably fixed and which is insertable through a disk hole, a turntable portion extending radially outward from the boss portion, and a cylindrical portion extending from an outer periphery of and co-axial with the shaft and the turntable portion, the disk drive device further comprising a driving magnet attached to an inner surface of the cylindrical portion, and a clamping magnet attached to the turntable portion for attracting a disk and on which a disk is mountable, an area of the rotor frame from the turntable portion to the boss portion comprising a ferromagnetic material.

2. The disk drive device according to claim 1, further comprising a groove portion between the boss portion of the rotor frame and the clamping magnet in a circumferential direction, there being a gap between the boss portion of the rotor frame and the clamping magnet.

3. The disk drive device according to claim 1, further comprising a nonslip material, having a larger coefficient of friction than the clamping magnet, attached to a disk mounting portion of the clamping magnet, such that a disk is mountable on the turntable portion of the rotor frame via the clamping magnet and the nonslip material.

4. The disk drive device according to claim 1, wherein the rotor frame is formed so that the boss portion and the turntable portion are separate from each other.

5. The disk drive device according to claim 1, wherein the turntable portion of the rotor frame is thicker than the cylindrical portion.

6. The disk drive device according to claim 1, wherein the whole rotor frame comprises ferromagnetic material.

* * * * *